Figure 1:
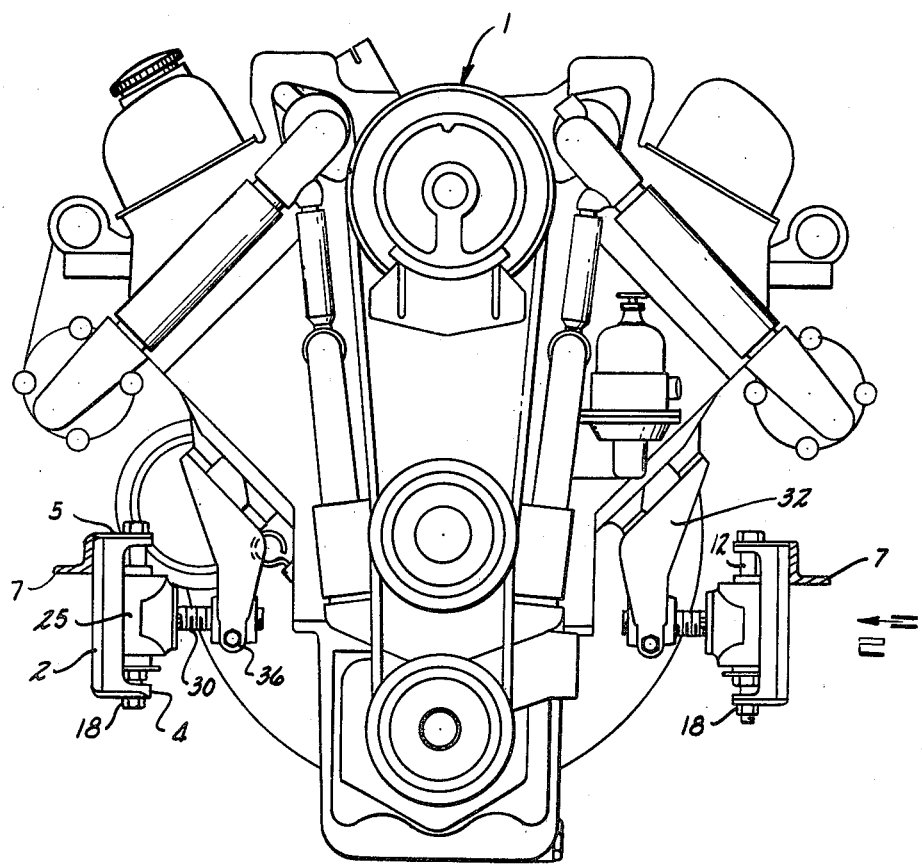

Dec. 16, 1958 C. W. VAN RANST 2,864,574
ENGINE MOUNTING FOR BOATS

Filed Sept. 9, 1955 3 Sheets-Sheet 1

INVENTOR.
CORNELIUS W. VAN RANST
BY
SMITH, OLSEN & KOTTS
ATTORNEYS

Dec. 16, 1958     C. W. VAN RANST     2,864,574
ENGINE MOUNTING FOR BOATS
Filed Sept. 9, 1955     3 Sheets-Sheet 2
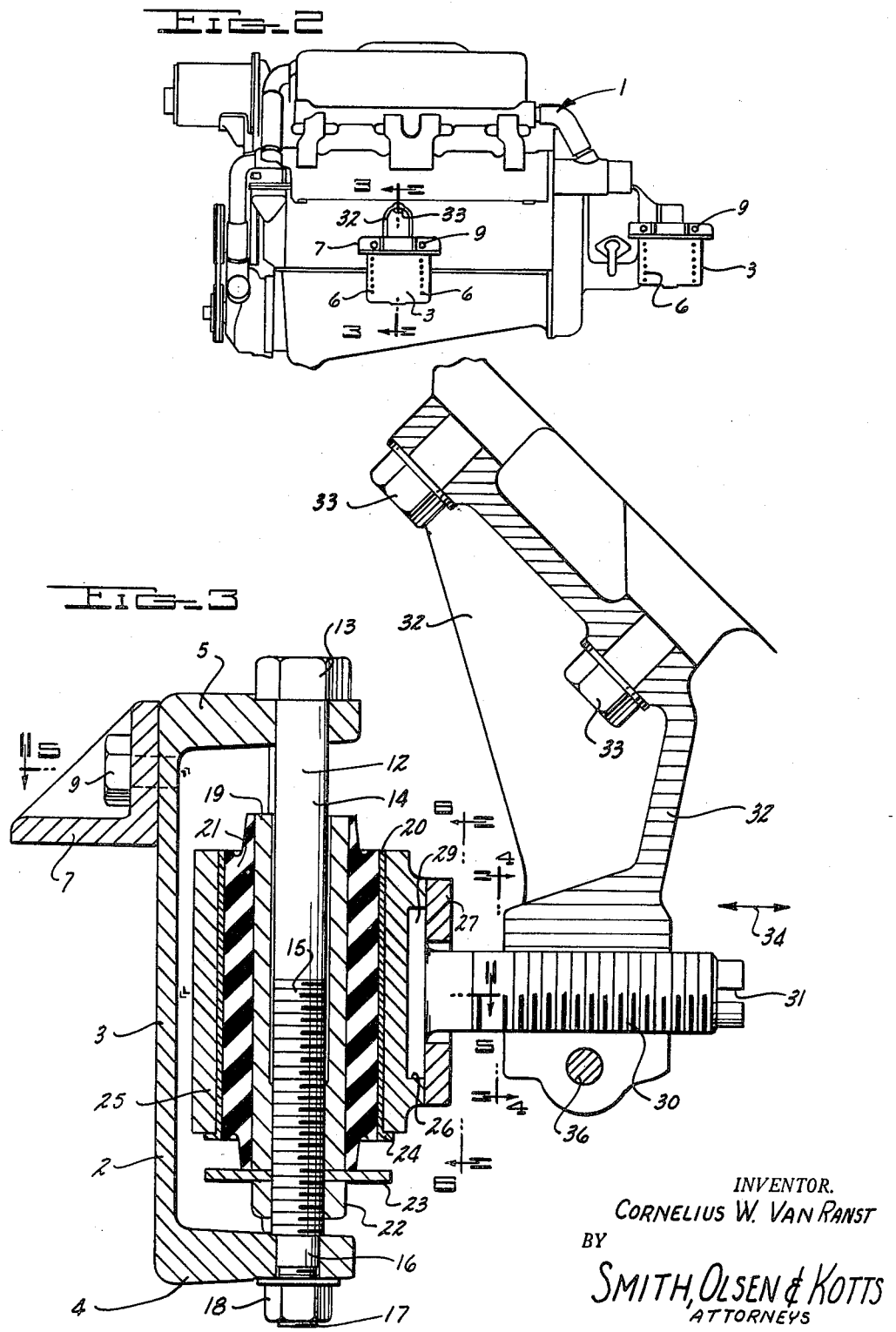
INVENTOR.
CORNELIUS W. VAN RANST
BY
SMITH, OLSEN & KOTTS
ATTORNEYS Dec. 16, 1958  C. W. VAN RANST  2,864,574
ENGINE MOUNTING FOR BOATS
Filed Sept. 9, 1955  3 Sheets-Sheet 3
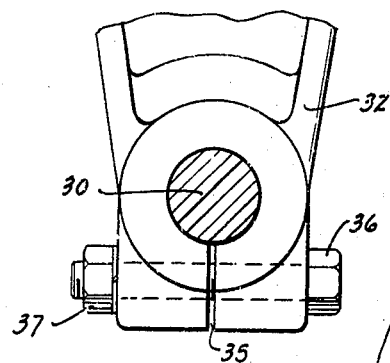
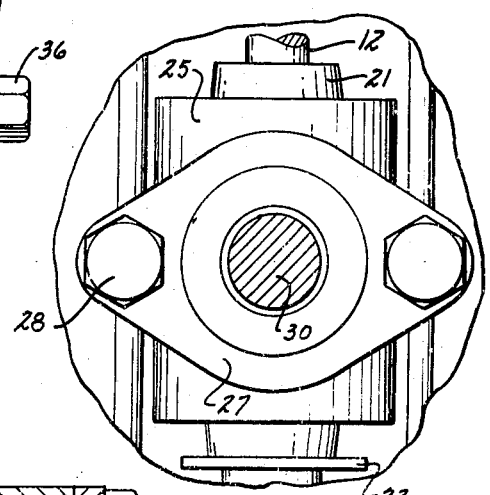
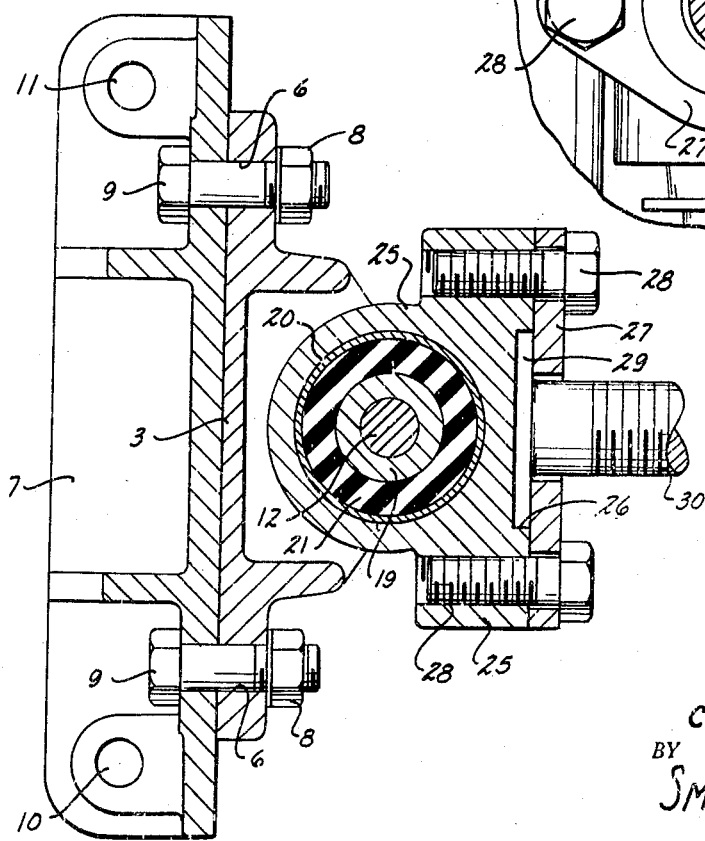
INVENTOR.
CORNELIUS W. VAN RANST
BY
SMITH, OLSEN & KOTTS
ATTORNEYS United States Patent Office 2,864,574
Patented Dec. 16, 1958

2,864,574
ENGINE MOUNTING FOR BOATS
Cornelius W. Van Ranst, Dearborn, Mich.
Application September 9, 1955, Serial No. 533,378
6 Claims. (Cl. 248—10)

This invention relates to an engine mount.

Engines, and particularly marine engines are required to be very accurately aligned with respect to the shafts which they drive. In the past wedges have been employed between the fixed frames and engine in order to achieve the desired engine alignment. However, wedges have not proved to be satisfactory for this purpose. A single wedge may not have sufficient thickness to effect a large adjustment, and may have too great a thickness to effect a small adjustment. Also, manual manipulation and accurate adjustment of the wedges is very difficult.

The problem of engine alignment is complicated by the fact that the engine must in many cases be adjusted both vertically and laterally. Wedges are not easily adapted for lateral adjustments and the total range of adjustments achieved with the wedges is for this reason very limited.

Wedges are further deficient as engine mounting elements because they lack resilience. They are, therefore, unable to absorb or cushion engine vibrations.

One object of the present invention is to provide an engine mount which can be given a small or large adjustment in order to effect engine-shaft alignment.

Another object is to provide an engine mount which may be adjusted quickly and accurately.

Another object is to provide an engine mount which is capable of both vertical and lateral adjustments.

Another object is to provide an engine mount which will absorb and cushion engine vibrations.

Another object is to provide an engine mount of the above-mentioned type which can be manufactured at a relatively low cost.

Other objects of this invention will appear in the following description and appended claims, reference being had to the accompanying drawings forming a part of this specification wherein like reference characters designate corresponding parts in the several views.

In the drawings:

Fig. 1 is a front view of an engine supported on a mount constructed according to the invention, Fig. 2 is an elevational view taken in the direction of arrow 2 in Fig. 1, Fig. 3 is a sectional view taken on line 3—3 in Fig. 2, Fig. 4 is a sectional view on line 4—4 in Fig. 3, Fig. 5 is a sectional view on line 5—5 in Fig. 3, and Fig. 6 is a sectional view on line 6—6 in Fig. 3.

Before explaining the present invention in detail, it is to be understood that the invention is not limited in its application to the details of construction and arrangement of parts illustrated in embodiments and of being practiced or carried out in various ways. Also, it is to be understood that the phraseology or terminology employed herein is for the purpose of description and not of limitation.

In the drawings there is shown a marine engine 1 supported on four engine mounts constructed according to the invention.

Each of the engine mounts includes a bracket member 2 having a web portion 3 and end flanges 4 and 5. Web portion 3 is provided with two series of vertically spaced openings 6, the vertical spacing between adjacent openings being the same throughout the series. A frame-engaging support 7 is releasably secured on bracket member 2 by means of nut-bolt means 8, 9. Each of bolts 9 extends through one of openings 6 in web portion 3. By turning nuts 8 off of bolts 9 and repositioning the bolts in different ones of the openings 6 it is possible to vary the vertical position of support member 7 on bracket member 2. Support member 7 is adapted to rest on affixed frame member (not shown), and by varying the vertical position of member 7 relative to member 2 it is possible to raise or lower engine 1 relative to the frame member. When it is desired to put engine 1 in a raised position relative to the frame member, support member 7 is secured on bracket member 2 with each of bolts 9 extending through one of the lowermost openings 6. When it is desired to put engine 1 in a lowered position support member 7 is secured on bracket member 2 with each of bolts 9 extending through one of the uppermost openings 6. In order to secure the engine mount on the frame member there are provided in member 7 two through holes 10, 11 which are adapted to receive frame-engine mount securement means (not shown).

Openings 6 provide a coarse vertical adjustment for engine 1. In order to provide a fine or "micrometer" type vertical adjustment for the engine there is employed a threaded means in the form of a bolt 12. Bolt 12 includes a head portion 13, a smooth face portion 14, a threaded portion 15, a second smooth faced portion 16, and a second threaded portion 17. A nut 18 is threaded on threaded portion 17 for restricting bolt 12 to rotary movement in bracket 2. An internally threaded sleeve 19 meshingly engages threaded portion 17. Sleeve 19 is non-rotatably related to motor 1 so that when a manual turning movement is applied to head 13 sleeve 19 is caused to travel rectilinearly up and down on threaded portion 15, the direction of rectilinear motion being dependent on the direction in which head 13 is turned.

The adjustment provided by bolt 12 is a micrometer type adjustment, and the rectilinear length of threaded portion 15 need only be sufficient to move sleeve 19 up and down through the same distance as the vertical spacing between openings 6. If the engine is to be vertically adjusted through a distance greater than the spacings between adjacent openings 6 then support 7 is adjusted to the closest one of openings 6 and bolt 12 is turned in the appropriate direction to locate the engine in the exact position desired.

Encircling sleeve 19 is a second sleeve 20, and positioned between these sleeves is a body of resilient material 21, said material being bonded to both of the sleeves. A nut 22 is threaded on threaded portion 15 and serves to retain a stop element 23 against the lower face of sleeve 19. During flexing movement of material 21, as during vibrational movement of engine 1, element 23 may be engaged by the lower face 24 of sleeve 20 so as to prevent excessive movement of said sleeve and resilient material. Beside its function as a retaining means for element 23, nut 22 serves also to prevent undesired turning movement of bolt 12, as might occur during vibrational movements of engine 1.

There is fixedly secured on sleeve 20 a support element 25. A cylindrical recess or socket 26 is formed in one face of element 25, and an annular plate 27 is secured over said recess by means of bolts 28. Rotatably and bearingly received in recess 26 is a cylindrical enlargement 29 formed integrally with a threaded shaft 30. The free end of shaft 30 is provided with a slot 31 which is adapted to receive a screw driver or other tool for effecting rotation of the shaft 30 enlargement in recess 26. The threaded portion of shaft 30 meshes with internal threads formed on an engine-engaging element 32. Bolt means 33 fixedly secure element 32 on the engine. The shape of element 32 will, of course, be dependent on the engine contour.

The arrangement is such that manually applied turning movement of shaft 30 causes element 32 (and the engine carried thereby) to move rectilinearly in the directions of arrows 34. In order to prevent vibrational movements of engine 1 from causing undesired turning movement of shaft 30, element 32 is split at 35 (Fig. 4) and a bolt 36 is extended through aligned openings in the element. A nut 37 holds bolt 36 in the aligned openings. By turning nut 37 in on bolt 36 the arms 38, 39 are caused to frictionally draw against the threaded portion of shaft 30 so as to prevent relative movement between said shaft and element 32. When it is desired to adjust the position of element 32 relative to shaft 30 nut 37 is loosened and shaft 30 is turned as previously described.

I claim:

1. An engine mount comprising a bracket member having at least one series of openings, evenly spaced in a rectilinear direction; a frame-engaging support having securing means releasably extended through one of said openings, whereby to permit said securing means to extend selectively through any of said openings; resilient means; a threaded member operatively connected between said bracket member and said resilient means for adjusting said resilient means relative to said bracket member through a distance corresponding to the spacing between two adjacent openings of said series; engine-engaging means; and means operatively connected between said resilient means and said engine-engaging means for rectilinearly adjusting said engine-engaging means in an angular direction with respect to said first rectilinear direction.

2. An engine mount comprising a bracket member having a web portion and two end flanges, and having at least one series of openings in said web portion, evenly spaced in a rectilinear direction at right angles to the end flanges; a frame-engaging support having securing means releasably extended through one of said openings, whereby to permit said securing means to extend selectively through any of said openings; a threaded member mounted between said end flanges and having a shaft portion rotatably mounted in one of said flanges, an internally threaded sleeve meshingly engaging said threaded member for rectilinear movement through a distance corresponding to the spacing between two adjacent openings of said series in response to rotary movement of said threaded member; a support element encircling said sleeve; resilient means operatively connected between said sleeve and support element; a shoulder element spaced from said support element and in the path thereof during flexure of said resilient means to limit the movement of said support element; circular bearing means formed in said support element and having its axis at an angle to the threaded member; a threaded pin mounted for rotary movement in said bearing element; and an engine-engaging means threadedly connected to said pin means for rectilinear adjustment in response to turning of said pin.

3. An engine mount comprising a bracket member including a generally vertical web portion with generally horizontally extending upper and lower end flanges, said web portion having a series of openings evenly spaced in a vertical direction, a support adapted to be secured to a supporting surface and carrying attaching elements releasably inserted through one of said openings and adapted to be removed and selectively inserted into another of said openings for adjusting the vertical position of the bracket member with respect to the support in accordance with predetermined increments, a threaded member mounted in a vertical position for rotation about its axis in said upper and lower end flanges, a sleeve threadedly connected to said threaded member for vertical movement between said end flanges through a distance corresponding to the spacing between two adjacent openings of said series, a support element encircling said sleeve in radially spaced relation and having a socket in its outer wall, a resilient body operatively connected between said sleeve and said support element, a threaded pin having an enlarged head retained in said socket and adapted to be rotated about its axis, and an engine-engaging element threadedly connected to said pin for rectilinear adjustment in response to turning of said pin.

4. An engine mount comprising a bracket member including a generally vertical web portion with generally horizontally extending upper and lower end flanges, said web portion having a series of openings evenly spaced in a vertical direction, a support adapted to be secured to a supporting surface and carrying attaching elements releasably inserted through one of said openings and adapted to be removed and selectively inserted into another of said openings for adjusting the vertical position of the bracket member with respect to the support in accordance with predetermined increments, a threaded member mounted in a vertical position for rotation about its axis in said upper and lower end flanges, a sleeve threadedly connected to said threaded member for vertical movement between said end flanges through a distance corresponding to the spacing between two adjacent openings of said series, a support element encircling said sleeve in radially spaced relation and having a socket in its outer wall, a resilient body operatively connected between said sleeve and said support element, a threaded pin having an enlarged head retained in said socket and adapted to be rotated about its axis, an engine-engaging element threadedly connected to said pin for rectilinear adjustment in response to turning of said pin, said resilient body being formed of rubber-like material of generally cylindrical shape with an annular depending portion of reduced wall thickness, and a shoulder element axially spaced from said shoulder element and against which said annular depending portion abuts.

5. An engine mount as claimed in claim 4 wherein said annular depending portion is an extension of the inner wall portion of said resilient body.

6. An engine mount comprising a bracket member including a generally vertical web portion with generally horizontally extending upper and lower end flanges, said web portion having a series of openings evenly spaced in a vertical direction, a support adapted to be secured to a supporting surface and carrying attaching elements releasably inserted through one of said openings and adapted to be removed and selectively inserted into another of said openings for adjusting the vertical position of the bracket member with respect to the support in accordance with predetermined increments, a threaded member mounted in a vertical position for rotation about its axis in said upper and lower end flanges, a sleeve threadedly connected to said threaded member for vertical movement between said end flanges through a distance corresponding to the spacing between two adjacent openings of said series, a support element encircling said sleeve in radially spaced relation and having a socket in its outer wall, an annular rubber-like body disposed between said support element and said sleeve and bonded to the latter, a second sleeve bonded to the outer surface of said body and having a retaining flange extending radially outwardly from its lower edge on which said support element is seated, a threaded pin having an enlarged pin having an enlarged head retained in said socket and adapted to be rotated about its axis, and an engine-engaging element threadedly connected to said pin for rectilinear adjustment in response to turning of said pin.

References Cited in the file of this patent

UNITED STATES PATENTS

| | | |
|---|---|---|
| 1,815,362 | Pinson | July 21, 1931 |
| 2,162,400 | Heath | June 13, 1939 |
| 2,383,645 | Hahn | Aug. 28, 1945 |

FOREIGN PATENTS

| | | |
|---|---|---|
| 230,919 | Great Britain | Mar. 19, 1925 |
| 666,908 | Great Britain | Feb. 20, 1952 |
| 917,652 | Germany | Sept. 9, 1954 |

OTHER REFERENCES

Publication, "Rubber A New Material in Machine Design." (Copy in Div. 52.)